United States Patent [19]
Premji et al.

[11] Patent Number: 5,390,980
[45] Date of Patent: Feb. 21, 1995

[54] ZERO CHUCK VEHICLE SEAT LATCHING MECHANISM

[75] Inventors: Gulam Premji; Simon X. He, both of Mississauga, Canada

[73] Assignee: Bertrand Faure Ltd., Mississauga, Canada

[21] Appl. No.: 15,793

[22] Filed: Feb. 10, 1993

[51] Int. Cl.⁶ .............................................. B60N 2/02
[52] U.S. Cl. .......................... 297/378.12; 297/378.11
[58] Field of Search ........................ 297/378.12, 378.11

[56] References Cited

U.S. PATENT DOCUMENTS

| | | |
|---|---|---|
| 4,103,967 | 8/1978 | Tanaka et al. . |
| 4,118,067 | 10/1978 | Tanaka . |
| 4,223,946 | 9/1980 | Kluting .......................... 297/378.11 |
| 4,318,569 | 3/1982 | Bilenchi et al. . |
| 4,366,984 | 1/1983 | Klueting et al. . |
| 4,429,919 | 2/1984 | Klueting et al. . |
| 4,438,974 | 3/1984 | Kresky et al. . |
| 4,518,190 | 5/1985 | Kluting et al. .................. 297/378.12 |
| 4,634,182 | 1/1987 | Tanaka .......................... 297/378.11 |
| 4,707,010 | 11/1987 | Croft et al. . |
| 4,720,145 | 1/1988 | Bell . |
| 4,733,912 | 3/1988 | Secord . |
| 4,836,608 | 6/1989 | Sugiyama . |
| 4,846,526 | 7/1989 | Allen . |
| 4,919,482 | 4/1990 | Landis et al. .................... 297/378.11 |
| 5,100,202 | 3/1992 | Hughes .......................... 297/378.11 |
| 5,265,937 | 11/1993 | Allen ............................. 297/378.12 |

FOREIGN PATENT DOCUMENTS 562392 8/1958 Canada .

*Primary Examiner*—Clifford D. Crowder
*Assistant Examiner*—Bibhu Mohanty
*Attorney, Agent, or Firm*—Patrick J. Hofbauer

[57] ABSTRACT

A seatback latching mechanism for use in a vehicle seat assembly having a seatback member pivotally tiltable over a seat cushion member is disclosed. The latching mechanism is used to secure the seatback member against pivotal movement in a forward angular direction relative to the seat cushion member, when the seatback member in its relatively upright angular orientation, by latching first and second hinged members. There are first and second stop means securely affixed to the first hinged member, first and second abutment means securely affixed to the second hinged member, and a selectively positionable latch member rotatably mounted on the first hinged members for movement between a latching position and an unlatching position. When the selectively positionable latch member is in the latching position, the first stop means and the first abutment means are in intimate contact with one another so as to preclude unwanted pivotal movement of the first and second hinged members with respect to each other in the rearward angular direction. Further, a first contact surface on the selectively positionable latch member and the second abutment means are in intimate contact with one another, and the selectively positionable latch member is physically interposed between the second stop means and the second abutment means so as to preclude unwanted pivotal movement of the first and second hinged members with respect to each other in the forward angular direction. Resultingly, there is substantially no radial lost motion between the first hinged member and the second hinged member in the first relative angular orientation.

16 Claims, 4 Drawing Sheets

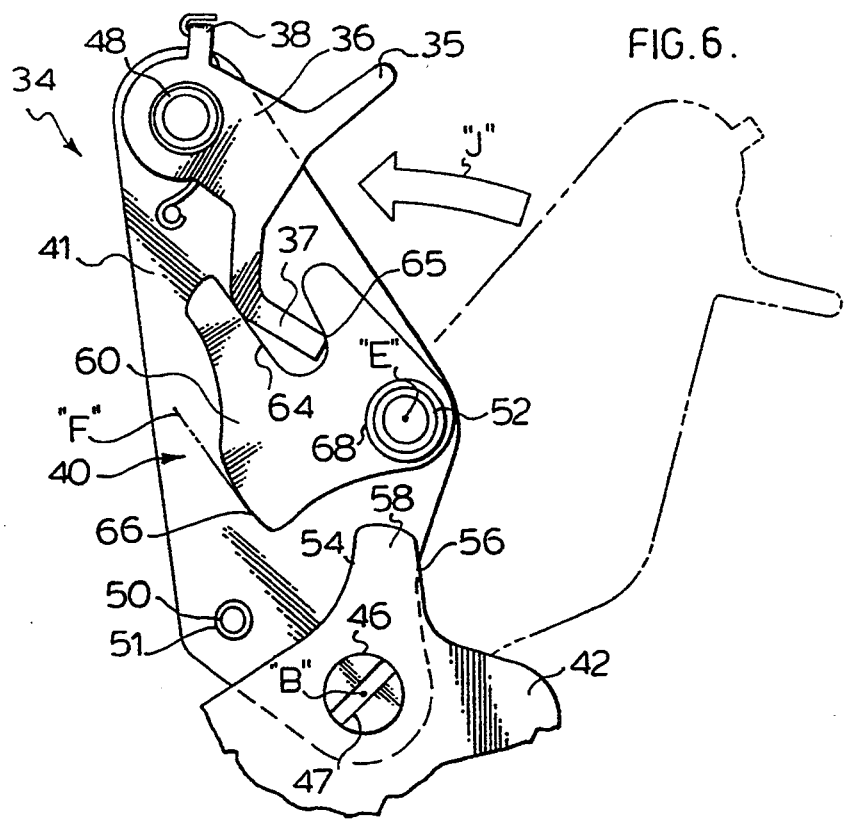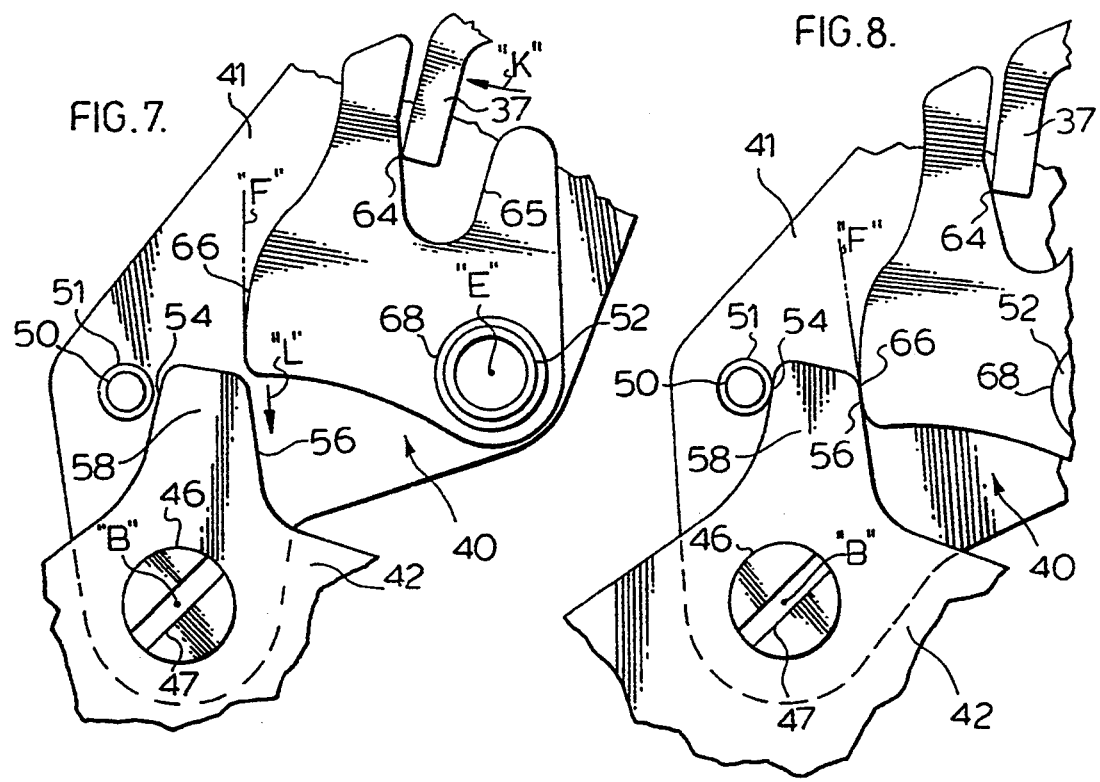

ZERO CHUCK VEHICLE SEAT LATCHING MECHANISM

FIELD OF THE INVENTION

The present invention relates to hinge assemblies in vehicle seats and more particularly to latching mechanisms for such hinge assemblies. Further, this invention relates to manually operated latch mechanisms.

BACKGROUND OF THE INVENTION

A vehicle seat hinge assembly for use in a two door vehicle, wherein entry into the rear passenger area necessitates "dumping" of the seatback over the seat cushion, typically comprises a pair of hinged members, preferably strong metal plates, pivotally attached to each other by a common pivot pin. One of the hinged members is attached to the seatback portion of the vehicle seat and the other is attached to the seat cushion portion of the vehicle seat. In such hinge assemblies, there is a first stop means, typically a metal post, mounted on one hinged member, that abuts against an abutment member on the other hinged member, so as to thereby define an upright driving position. This upright driving position may or may not be adjustable independently of the "dumping" of the seatback over the seat cushion, depending upon the particular vehicle application and the hinge mechanism therein necessarily employed.

In order to preclude the seatback from unwantedly "dumping" over the seat cushion, such as might occur during rapid braking of a vehicle, a latching mechanism is employed, either a manually operative latching mechanism or an inertial latching mechanism.

Prior art manually operable latching mechanisms and inertial latching mechanisms for use in vehicle seat hinge assemblies are well known. While various embodiments of such prior art manually operable latching mechanisms and inertial latching mechanisms have been used in vehicle seat hinge assemblies with reasonable success, they all have at least one common drawback. This drawback is exemplified in the form of "chuck", which is a term known in the art that refers to the mechanical lost motion due to the clearances between various adjacent parts within a mechanism, in this case the latching mechanism of a vehicle seat hinge assembly. Clearance is defined as the distance between adjacent parts of a mechanism. Clearance is generally necessary in order to fit the various parts of a mechanism together, and to facilitate smooth operation of the mechanism without jamming. Clearances are, however, often larger than desirable or otherwise necessary for smooth operation because of the variation in size from one replication of a mass produced mechanical part, such as a seat hinge assembly, to the next (i.e., because of manufacturing tolerances). Moreover, in an assembly of mass produced mechanical parts, such as a vehicle latching mechanism of a seat hinge assembly, the clearances between adjacent parts can stack, both positively and negatively, which makes overall latching performance of any particular latching mechanism selected from a set of similarly mass-produced latching mechanisms all the more unpredictable.

Chuck is experienced whenever externally applied forces are applied to the parts of a mechanism so as to cause relative movement between the parts of the mechanism. Such external forces include the forwardly directed momentum of the seatback with respect to the seat cushion, which is experienced during sudden deceleration of a vehicle. Chuck is a highly undesirable characteristic in vehicle seat hinges, for both safety and aesthetic reasons. In terms of safety, the inertia of the seatback is transferred to the torso of a person sitting in that seat, which increases the likelihood of injury to that person in a forward crash situation. In terms of aesthetics, a seatback can visually appear loose, or can rattle, either of which suggests poor quality. In fact, the existence of any chuck, from the marketing point of view, is in diametric opposition with modern trends to increased safety, reliability, and quality of vehicle seats.

In vehicle seats employing a manually operable latching mechanism, there is typically present a selectively releasable latching mechanism that is used to latch the seatback member in the normal upright position, thereby substantially precluding pivotal movement of the seatback member with respect to the seat cushion, for reasons of safety during deceleration of a vehicle. The selectively releasable latching mechanism may be, for example, a pivoting arm with a hook portion on the end thereof, which pivoting arm may be mounted on one of the hinged members. In this manner, the selectively releasable latching mechanism interacts with a second stop means, typically a metal post, that is securely attached to the other hinged member. A handle portion of the selectively releasable latching mechanism extends from the seatback portion of the vehicle seat so as to be readily accessible by a user to selectively latch and release the two hinged members in a set orientation with respect to each other by correspondingly engaging and disengaging the second stop means. The hook portion of the selectively releasable latching mechanism engages the second stop member so as to preclude forwardly directed pivotal movement of the seatback with respect to the seat cushion. As is inherent with any prior art manually operable latching mechanism, there is a small clearance between the hook portion of the pivoting arm and the second stop means, when the latching mechanism is in its latching position, which clearance increases over time with wear. This small clearance allows chuck of the seatback with respect to the seat cushion to occur when the seat cushion is under the influence of a forwardly directed external force, or due to inertia of the seatback during sudden deceleration of the vehicle.

In vehicle seat hinges employing an inertial latching mechanism, there is a further factor causing additional chuck of the seatback with respect to the seat cushion, as will now be described. In a typical prior art inertial latching mechanism, the mechanism for precluding forward motion of the seatback with respect to a seat cushion typically comprises an abutment means located on the hinged member that is attached to the seat cushion and an inertially actuatable moveable latch pawl member pivotally mounted on the hinged member that is attached to the seatback. Such a prior art inertial latching mechanism is well exemplified by the LOW-CHUCK INERTIAL LATCHING MECHANISM FOR SEAT ASSEMBLIES disclosed in U.S. Pat. No. 5,100,202 (Hughes), which patent is incorporated herein by reference.

In the Hughes patent, the latch pawl is pivotally mounted about a pivot pin on one hinged member, for movement between a latching position and an unlatching position. In the latching position, the latch pawl is oriented such that a leading edge thereof is opposed to, but spaced away from an abutment means on the other hinged member. In use, when the inertial latching mechanism undergoes sudden deceleration, so as to decrease its speed in a forward direction, the seatback and the hinged member attached thereto begin to pivot forwardly. The latch pawl, which is mounted on that hinged member, also moves forwardly until it contacts the abutment means, which is on the other hinged member. The distance moved by the latch pawl is in the order of ¼", which corresponds to about 3° to about 5° of radial lost motion (chuck) of the seatback with respect to the seat cushion. In some earlier inertial seat latches, the chuck of the seatback before latching of the device can be as high as 8°, for example, in the mechanism disclosed in U.S. Pat. No. 4,318,569 (Bilenchi et al.) issued Mar. 9, 1982.

It can be seen that a latching mechanism that substantially eliminates chuck of the seatback of a vehicle seat with respect to the seat cushion is not generally known in the prior art, although the reduction of such chuck has posed a continuing problem for vehicle seat hinge designers. As indicated above, such a latching mechanism would be highly desirable for both safety and aesthetic reasons.

SUMMARY OF THE INVENTION

It is therefore an object of the present invention to provide a latching mechanism, for use in a vehicle seat hinge assembly, that substantially eliminates chuck of the seatback of a vehicle seat with respect to the seat cushion.

It is another object of the present invention to provide a latching mechanism, for use in a vehicle seat hinge assembly, that provides for substantial elimination of chuck of the seatback of a vehicle seat with respect to the seat cushion by providing a mechanism that accommodates for manufacturing tolerances which arise as a necessity in the mass-production of the various parts of the vehicle seat hinge assembly.

It is yet another object of the present invention to provide a latching mechanism for use in a vehicle seat hinge assembly that is simple and inexpensive to manufacture and which is readily adaptable for substituted use in place of existing vehicle seat latching mechanisms without the need for extensive modification to existing vehicle seat hardware and production tooling for such hardware.

A seatback latching mechanism embodying the present invention is particularly adapted for use in a vehicle seat assembly having a seatback member pivotally tiltable over a seat cushion member. The latching mechanism of the present invention comprises first and second stop means securely affixed to the first hinged member, first and second abutment means securely affixed to the second hinged member, and a selectively positionable latch member movably mounted on a selected one of the first and second hinged members for movement between a latching position and an unlatching position. The first and second hinged members are held in a first relatively upright angular orientation when the selectively positionable latch member is in the latching position, and the first and second hinged members are free to move between the first relatively upright angular orientation and a second relatively folded angular orientation when the selectively positionable latch member is in the unlatching position. When the selectively positionable latch member is in the latching position: the first stop means and the first abutment means are in intimate contact with one another so as to preclude unwanted pivotal movement of the first and second hinged members with respect to each other in the rearward angular direction; a first contact surface on the selectively positionable latch member and the second abutment means are in intimate contact with one another, and the selectively positionable latch member is functionally interconnected between the second stop means and the second abutment means so as to preclude unwanted pivotal movement of the first and second hinged members with respect to each other in the forward angular direction, and such that there is substantially no radial lost motion between the first hinge arm and the second hinge arm in the first relative angular orientation.

In order that the invention may be readily understood and its objects more fully appreciated, one embodiment thereof will now be described, by way of example only, with reference to the accompanying drawings.

DETAILED DESCRIPTION OF A PREFERRED EMBODIMENT

Introduction to the Drawings

FIG. 6 is a partially cut-away side elevational view similar to FIG. 5, with a hinged member of the latching mechanism being shown in ghost-outline in the position of FIG. 5 and with the same hinged member being shown in solid outline in a position corresponding to the seatback being pivotally tilted over the seat cushion;

FIG. 7 is an enlarged partially cut-away side elevational view of the latching mechanism of the present invention showing the latch member moving toward its latching position under urging of the manually operable lever means as the seatback returns to its generally upright design position; and, FIG. 8 is an enlarged partially cut-away side elevational view similar to FIG. 7, showing the latch member having returned to its latching position.

Figure 1:
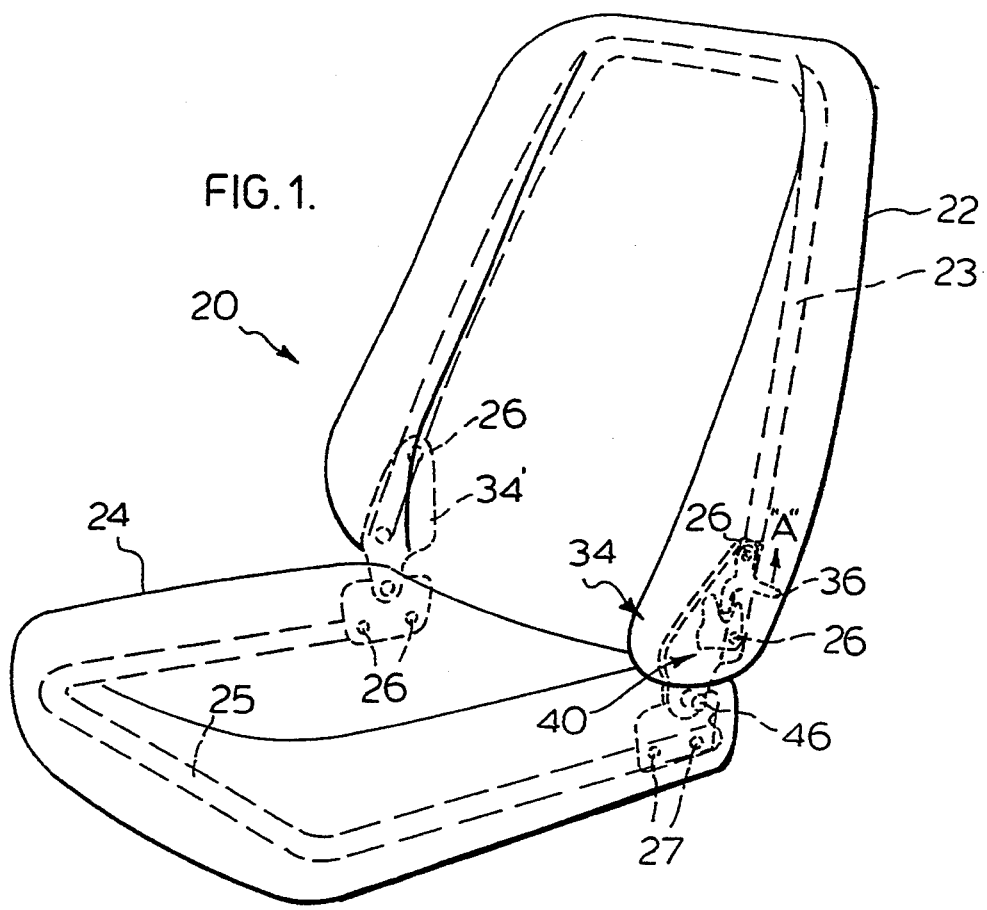
FIG. 1 is a perspective view of a vehicle seat assembly showing a vehicle seat hinge assembly having a manually operable latching mechanism according to a preferred embodiment of the present invention installed therein.
Figure 2:
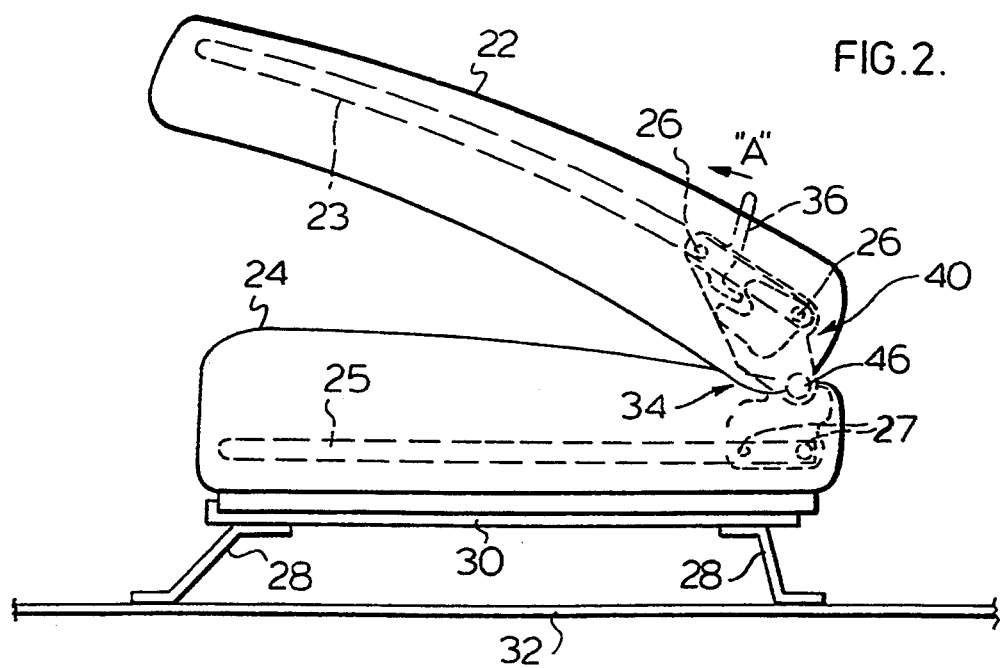
FIG. 2 is a side elevational view of the vehicle seat assembly of FIG. 1, with the seatback pivoted over the seat cushion, after the manually operable latching mechanism has been unlatched.

Reference will now be made to FIGS. 1 and 2, which show a conventional vehicle seat, indicated by the general reference numeral 20, having the seatback latching mechanism, indicated by the general reference numeral 40, of the present invention installed thereon. The vehicle seat 20 comprises a seatback cushion 22 having a first frame portion 23, and a seat cushion member 24 having a second frame portion 25. The first 23 and second 25 frame portions are conventional in design and provide rigidity to the seatback member 22 and the seat cushion member 24 respectively. A pair of vehicle seat hinge assemblies, indicated by the general reference numeral 34, 34' are securely attached to the first 23 and second 25 frame portions, one on each side of the vehicle seat 20, by way of two pairs of mounting bolts 26, 27. In this manner, the seat cushion member 24 is adapted to be pivotally tiltable over the seat cushion. As can be seen in FIG. 2, the seat cushion member 24 is secured to a conventional seat track mechanism 30, which is in turn mounted on a seat support frame 28 that is secured to the floor pan 32 of a vehicle (not shown).

FIGS. 1 and 2 show a vehicle seat 20 of the so-called "bucket" type, with which a pair of vehicle seat hinge assemblies 34, 34' having the seatback latching mechanism 40 of the present invention therein, may be used. A so-called "bench" type seat assembly may also use vehicle seat hinge assemblies having the seatback latching mechanism of the present invention. In this latter case, it is preferable to use one latching mechanism according to the present invention at each of the two sides of the "bench" type seat assembly. It is generally accepted that with "bucket" type seat assemblies it is sufficient to use a single seatback latching mechanism 40 for each vehicle seat 20 installed, although, in particular applications it may be desirable to use a seatback latching mechanism according to the present invention at both sides of the "bucket" type seat assembly. For simplicity of description, the preferred embodiment described herein will be with reference to installation of a single seatback latching mechanism 40 on one (i.e., the right) side of the vehicle seat 20, in conjunction with the vehicle seat hinge assembly 34 illustrated in FIGS. 1 and 2.

In FIG. 1, the seatback is shown in a relatively upright angular orientation relative to the seat cushion member 24, as is normally adapted during driving or riding in a vehicle. In this upright orientation, the seatback latching mechanism 40 latches the seatback member 22 with respect to the seat cushion member 24. FIG. 2 shows the seatback member 22 tilted over the seat cushion member 24, which orientation is used to permit ingress and egress to the rear area of a two-door passenger vehicle. The seatback member 22 is tilted forwardly over the seat cushion member 24 upon release of the seatback latching mechanism 40, which release is performed by lifting the manually operable lever means 36 upwardly in the direction of arrow "A", as shown in FIGS. 1 and 2. The operation of the seatback latching mechanism 40 will be described in greater detail below.

Reference will now be made to FIGS. 3 through 6, which show the seatback latching mechanism 40 installed in a vehicle seat hinge assembly 34, which assembly is itself installed in the vehicle seat 20. The hinge assembly 34 has first 41 and second 42 hinged members that are pivotally mounted about a common first pivot 46 for pivotal movement about a hinge pivot axis "B". The first hinged member 41 is secured to the first frame portion 23 of the seatback member 22 by way of mounting bolts 26, through various apertures as will be discussed subsequently. The second hinged member 42 is secured to the second frame portion 25 of the seat cushion member 24 by way of mounting bolts 27 passing through apertures 45 in the second hinged member and similar apertures (not shown) in the second frame portion 25. Other similar generally accepted fastening method may also be used in place of mounting bolts 26, 27. The pivotal movement of the first 41 and second 42 hinged members about the hinge pivot axis "B" in forward and rearward angular directions, as indicated by arrows "C" and "D", respectively, allows the seatback member 22 to correspondingly move between the first relatively upright angular orientation and the second relatively folded angular orientation, with respect to the seat cushion member 24, as described above and illustrated in FIGS. 1 and 2, respectively. A return spring 49 is functionally mounted between slot 47 in the common pivot pin 46 and a pin 53 attached to the second hinged member 42, so as to bias the seatback 22 toward its first relatively upright angular orientation.

The seatback latching mechanism 40 is used to secure the seatback member 22 against pivotal movement in the forward angular direction relative to the seat cushion member 24, as shown by arrow "C", which forward movement is known in the industry as "dumping" of the seatback member 22 over the seat cushion member 24.

Figure 4:
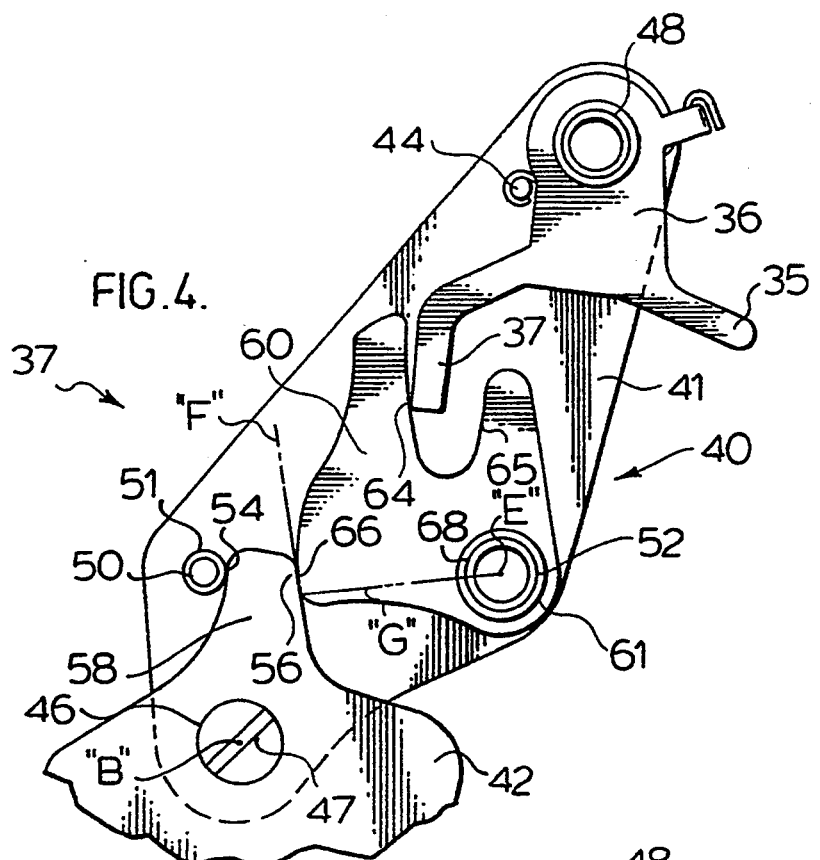
FIG. 4 is a partially cut-away side elevational view of a portion of the vehicle seat hinge assembly of FIG. 3, with a bottom portion of the vehicle seat hinge assembly omitted for simplicity, and illustrating the preferred embodiment of manually operable latching mechanism in a latched configuration.
Figure 5:
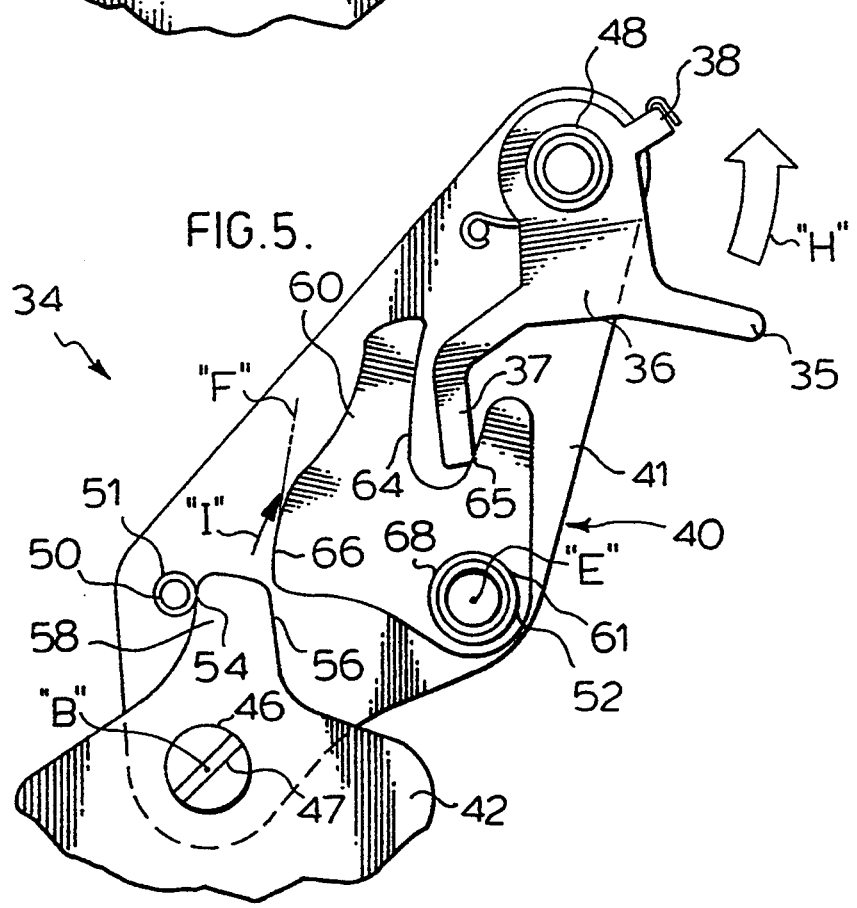
FIG. 5 is a partially cut-away side elevational view similar to FIG. 4, illustrating the manually operable latching mechanism in an unlatched configuration.

A selectively positionable latch member 60 is pivotally mounted on the first hinged member 41 for pivotal movement about a latch pivot axis "E" between a latching position as shown in FIG. 4 and an unlatching position as shown in FIG. 5. This selectively positionable latch member 60 is used to selectively secure the seatback member 22 from pivotal movement with respect to the seat cushion member 24.

The seatback latching mechanism 40 further comprises a manually operable lever means 36 that is pivotally mounted on the first hinged member 41 about a pivot bushing 48. The manually operable lever means 36 has a handle portion 35 extending outwardly from the seatback member 22 and an arm portion 37 that is adapted to interact with the selectively positionable latch member 60.

The first hinged member 41 has a first stop means 50 positioned thereon in the form of a cylindrical pin extending between the first hinged member 41 and the third hinged member 43 (shown cut-away in FIG. 3), which third hinged member 43 is of the same outline as the first hinged member 41. The first stop means 50 is shouldered at each end so as to fit into cooperating apertures 51 in each of the first 41 and third 43 hinged members so as to form a connecting means between the first 41 and third 43 hinged members. The first stop means 50 thereby acts as a spacer to retain the first 41 and third 43 hinged members in operative spaced relation to each other in addition to acting as a stop means. The first stop means 50 can be secured by punching, rivetting, welding, ring staking, orbital staking, or otherwise held in the co-operating apertures 51, 51 by any conventional attachment means. Similarly, a second stop means 52 in the form of a hollow pivot bushing is securely affixed to and extends between the first hinged member 41 and the third hinged member 43. The second stop means 52 is also shouldered at each end so that the smaller diametrical end portions thereof fit into cooperating apertures in each of the first 41 and third 43 hinged members so as to assist in connecting together the first 41 and third 43 hinged members. The second stop means 52 is also adapted to receive the selectively positionable latch member 60 thereon in pivotal relation thereto. The second stop means 52 thereby acts as a spacer to retain the first 41 and third 43 hinge members in operative spaced relation and acts as a pivot means, in addition to acting as a stop means. Preferably, the second stop means 52 is retained securely in between the first 41 and third 43 hinged members by one of the mounting bolts 26 which passes through the center of the second stop means and the cooperating apertures in each of the first 41 and third 43 hinged members so as to attach the first hinged member 41 to the first frame portion 23. In the preferred embodiment illustrated, the first stop means 50 is located ahead of the second stop means 52.

The pivot bushing 48, on which the selectively positionable latch member 60 is mounted, is also in the form of a hollow bushing that is securely affixed to and extends between the first hinged member 41 and the third hinged member 43. The pivot bushing 48 is also shouldered at each end so as to have its narrower end portions fit into cooperating apertures in each of the first 41 and third 43 hinged members to further assist in connecting together the first 41 and third 43 hinged members. The pivot bushing 48 thereby also performs a dual function by acting as a spacer to retain the first 41 and the third 43 hinged members in operative spaced relation to each other, in addition to acting as a pivot pin. Preferably, the pivot bushing 48 is also retained securely in place by one of the mounting bolts 26, which attach the first hinged member 41, the third hinged member 43 to the first frame portion 23.

The second hinged member 42 has a first 54 and a second 56 abutment means securely affixed thereto, preferably formed as an integral part of the second hinged member 42. The first 54 and second 56 abutment means together form a spur member 58 that is physically interposed between the first stop means 50 and the first contact surface 66 of the selectively positionable latch member 60, when the selectively positionable latch member 60 is in its latching position.

The selectively positionable latch member 60 has an aperture 61 therein that is adapted to receive the second stop means 52 therein. An advantage of mounting the latch member 60 on the second stop means 52 is that a separate pivot pin is not required, thus eliminating an extra part from the assembly with the attendant decrease in cost, complexity and assembly time. A generally forwardly facing portion of the selectively positionable latch member 60 has a first contact surface 66 thereon. The rearwardly facing portion of the selectively positionable latch member 60 at the aperture 61 forms a second contact surface 68, which contacts the forwardly facing portion of the second stop means 52. The arm portion 37 of the manually operable lever means 36 interacts with the selectively positionable latch member 60 at a first interfacing surface 64 and a second interfacing surface 65. A spring biasing member 62 is mounted between a receiving pin 44 and a spring receiving portion 38 of the manually operable lever means 36. The receiving pin 44 is shouldered at each end so as to fit into cooperating apertures (not shown) in the first 41 and third 43 hinged members, so as to form a further connecting means therebetween. The receiving pin 44 thereby acts as a spacer to further assist in retaining the first 41 and third 43 hinged members in spaced relation in addition to acting as a receiving pin. The receiving pin 44 is preferably held in the cooperating apertures 44 in each of the first 41 and third 43 hinged members by the same connecting means as is the first stop means 50. The spring member 62 biases the arm portion 37 toward the first interfacing surface 64 of the selectively positionable latch member 60. In this manner, the spring biasing member 62 urges the selectively positionable latch member 60 toward its latching position.

Figure 3:
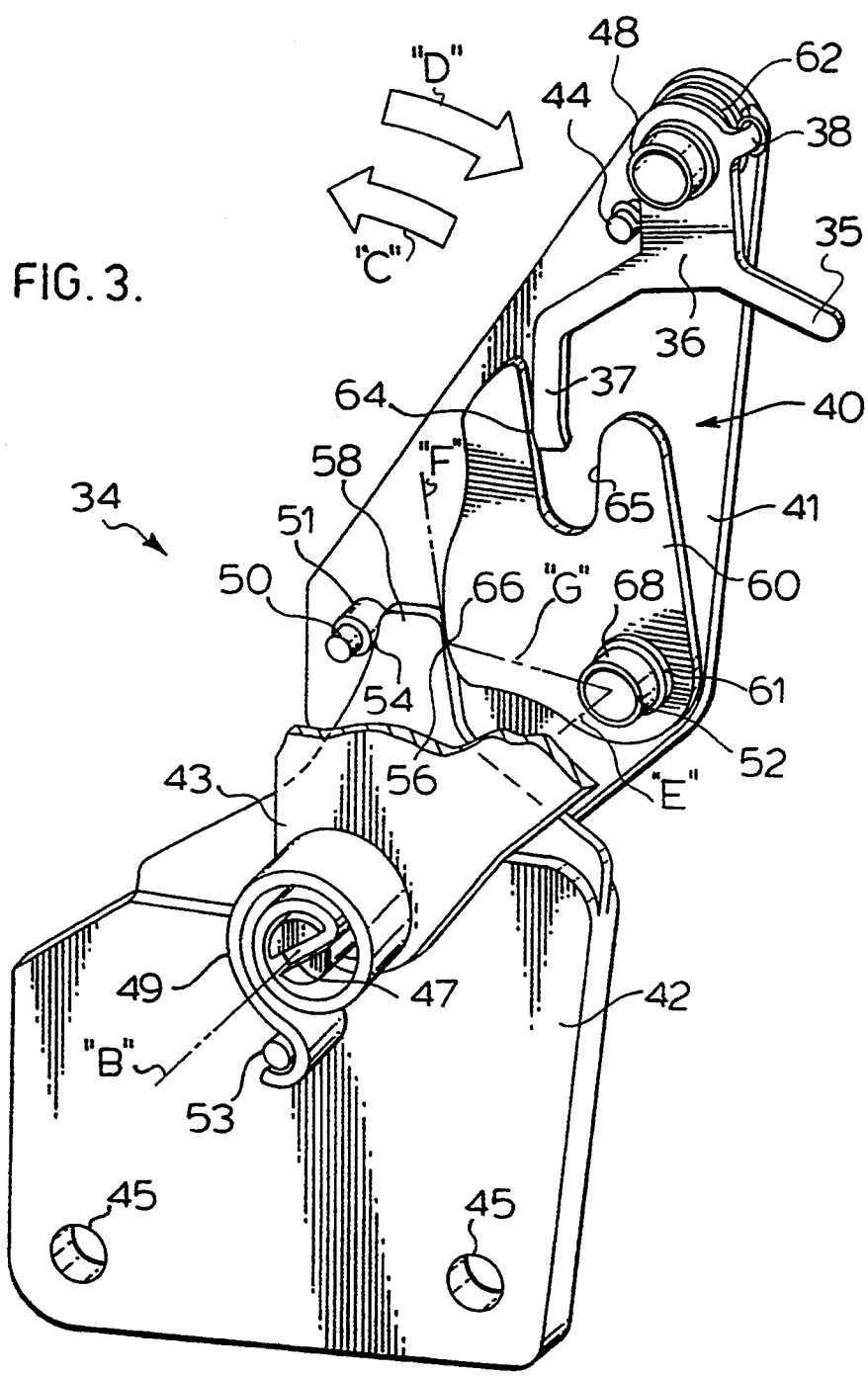
FIG. 3 is a side perspective view of the vehicle seat hinge assembly of FIGS. 1 and 2 shown separately from the vehicle seat assembly, with an upper portion of the hinge assembly cut-away for clarity.

When the selectively positionable latch member 60 is in its latching position, which corresponds to the seatback latching mechanism 40 being in a latched configuration, the first 41 and second 42 hinged members are held in the first relatively upright angular orientation, as best shown in FIG. 3. In this latching position, the first stop means 50, the spur member 58, the first contact surface 66 of the selectively positionable latch member 60 and the second contact surface 68 of the selectively positionable latch member 60, and the second stop means 52 are all located in seriatim with one another in the order stated from front to back. The first stop means 50 and the first abutment means 54 are in intimate contact with one another so as to preclude unwanted pivotal movement of the first 41 and second 42 hinged members with respect to each other in the rearward angular direction, as indicated by arrow "D". In this manner, the first stop means 50 acts so as to limit the rearwardly pivotally directed travel of the seatback member 22 with respect to the seat cushion member 24, and thereby define the upright position of the seatback member 22. Further, the first contact surface 66 on the selectively positionable latch member 60 is in intimate contact with the second abutment means 56 on the second hinged member 42 and the second contact surface 68 on the selectively positionable latch member 60 is in intimate contact with the second stop means 52. In this manner, the selectively positionable latch member 60 is functionally interconnected between the second stop means 52 and the second abutment means 56, by way of being physically interposed in snug relation between the second stop means 52 and the second abutment means 56. Such snug functional interconnection of the selectively positionable latch member 60 between the second stop means 52 and the second abutment means 56 precludes unwanted pivotal movement of the first 41 and second 42 hinged members with respect to each other in a forward angular direction, as indicated by arrow "C".

Corresponding to the above described precluding of unwanted pivotal movement in both the forward and rearward angular direction, the seatback member 22 is latched in the first relatively upright angular orientation with respect to the seat cushion member 24, such that there is no relative movement possible between the seatback member 22 and seat cushion member 24 when the selectively positionable latch member 60 is in its latching position. Resultingly, there is substantially no radial lost motion between the first hinged member 41 and the second hinged member 42 in the first relative angular orientation.

When the selectively positionable latch member 60 is in its latching position, the second abutment means 56 is the sole means of supporting the selectively positionable latch member 60 to thereby preclude further downwardly directed pivotal movement of the selectively positionable latch member 60. The tangent line "F" that is tangential to the portion of the first contact surface 66 that is in intimate contact with the second abutment means 56, is sloped upwardly and forwardly by an amount of about 5° to 6° with respect to a line "G" that passes through the latch pivot axis "E" and is also perpendicular to the tangent line "F" when the selectively positionable latch member 60 is in its latching position. The tangent line "F" thereby defines a corresponding ramp angle. This ramp angle is important in that it allows the selectively positionable latch member 60 to be pivotally moved into and out of its latching position with only a small amount of friction between the first contact surface 66 and the second abutment means 56, and also to be able to transmit forces generally horizontally from the second stop means 52 through to the spur member 58 on the second hinged member 42, as will be discussed in greater detail subsequently.

When the selectively positionable latch member 60 is in its unlatching position, which corresponds to the seatback latching mechanism 40 being in the unlatched configuration shown in FIG. 5, the first 41 and the second 42 hinged members are free to move between the first relatively upright angular orientation, which corresponds to the seatback member 22 being in its upright position, and the second relatively folded angular orientation which corresponds to the seatback member 22 being pivoted over the seat cushion member 24. The movement from the first relatively upright angular orientation to the second relatively folded angular orientation is best shown in FIG. 6, wherein the first relatively upright angular orientation is shown in ghost-outline and the second relatively folded angular orientation is shown in solid lining.

The center of gravity of the selectively positionable latch member 60 is located horizontally between the latch pivot axis "E" and the second abutment means 56, both when the selectively positionable latch member is in its latching and unlatching positions. Such placement of the center of gravity causes the first contact surface 66 to be biased downwardly towards contact with the second abutment means 56 at all times. In this manner, the selectively positionable latch member 60 is biased by gravity towards its latching position and moves to this position whenever the seatback member 22 is in its first relatively upright angular orientation.

The functioning of the seatback latching mechanism 40 of the present invention in its latched configuration will now be described with reference to FIG. 4. When a vehicle decelerates, the inertial forces of the seatback member 22 are transmitted therefrom, through the second stop member 50, through the selectively positionable latch member 60 to the spur member 58. Since the selectively positionable latch member 60 is in snug functional interconnection between the second stop means 52 and the second abutment means 56, the inertial forces of the seatback member 22 are transmitted from the seatback member 22 with substantially no lost radial motion (i.e. chuck) between the first hinged member 41 and the second hinged member 42.

The operation of the seatback latching mechanism 40 of the present invention in its unlatched configuration will now be described with reference to FIGS. 4 through 8. The handle portion 35 of the manually operable lever means 36 is moved from the lowered position as shown in FIG. 4, to the raised position as shown in FIG. 5, as indicated by arrow "H". The manually operable lever means 36 is thereby caused to rotate around the pivot bushing 48, thus causing the arm portion 37 to move away from the first interfacing surface .64 of the selectively positionable latch member 60 and into contact with the second interfacing surface 65. When the arm portion 37 contacts the second interfacing surface 65, the selectively positionable latch member 60 is caused to pivot about the second stop means 52, and thereby move from its latching position to its unlatching position as indicated by arrow "I". The seatback member 22 can then be tilted over the seat cushion member 24, which causes the first hinged member 41 to move with respect to the second hinged member 42 from its first relatively upright angular orientation to its second relatively folded angular position, as indicated by arrow "J" in FIG. 6.

Subsequently, the seatback member 22 can be returned to its first relatively upright angular orientation, as shown in FIG. 7. The handle portion 35 of the manually operable lever means 36 is released and the spring biasing member 62 causes the manually operable lever means 36 to pivot to its lowered position. Correspondingly, the arm portion 37 moves from the second interfacing surface 65 to the first interfacing surface 64 of the selectively positionable latch member 60 as indicated by arrow "K". The latch member 60 is thereby caused to pivot as indicated by arrow "L", from its unlatching position as shown in FIG. 7 to its latching position as shown in FIG. 8.

It will be understood by those skilled in the art that the invention is not to be limited to the exact construction shown and described, but that various changes and modifications may be made without departing from the spirit and scope of the invention as defined in the appended claims.

We claim:

1. A seat back latching mechanism for use in a vehicle seat hinge assembly installed in a vehicle seat having a seat back member pivotally tiltable over a seat member, wherein said hinge assembly has first and second hinged members pivotally mounted about a common first pivot for pivotal movement about a hinge pivot axis in forward and rearward angular directions between a first relatively upright angular orientation and a second relatively folded angular orientation and wherein said latching mechanism is used to secure said seat back member against pivotal movement in a forward angular direction relative to said seat member, said latching mechanism comprising:

first and second stop means securely affixed to said first hinged member;

first and second abutment means securely affixed to said second hinged member;

a selectively positionable latch member movably mounted on a selected one of said first and second hinged members for movement between a latching position and an unlatching position, with said first and second hinged members being held in said first relatively upright angular orientation when said selectively positionable latch member is in said latching position, and with said first and second hinged members being free to move between said first relatively upright angular orientation and said second relatively folded angular orientation when said selectively positionable latch member is in said unlatching position;

wherein, when said selectively positionable latch member is in said latching position:

(a) said first stop means and said first abutment means are in intimate contact with one another so as to preclude substantially all pivotal movement of said first and second hinged members with respect to each other in said rearward angular direction; and, (b) (i) a first contact surface on said selectively positionable latch member and said second abutment means are in intimate contact with one another; and, (b) (ii) said selectively positionable latch member is functionally interconnected between said second stop means and said second abutment means;

so as to both securely retain said first and second hinged members in said first relatively upright angular orientation and to preclude substantially all pivotal movement of said first and second hinged members with respect to each other in said forward angular direction, such that there is substantially no radial lost motion between said first hinged member and said second hinged member in said first relative upright angular orientation.

2. The seatback latching mechanism of claim 1, wherein said selectively positionable latch member is physically interposed between said second stop means and said second abutment means.

3. The seatback latching mechanism of claim 2, wherein said selectively positionable latch member is mounted on said second stop means.

4. The seatback latching mechanism of claim 3, wherein said selectively positionable latch member is pivotally mounted on said second stop means for pivotal movement about a latch pivot axis.

5. The seatback latching mechanism of claim 4, wherein said selectively positionable latch member is spring biased to said latching position by way of a spring biasing member mounted between said selectively positionable latch member and said first hinged member.

6. The seatback latching mechanism of claim 5, further comprising a manually operable lever means pivotally mounted on said first hinged member, said manually operable lever means having an arm portion that is adapted to interact with said selectively positionable latch member, wherein said spring member is mounted between said first hinged member and a spring receiving portion of said manually operable lever means so as to bias said arm portion toward said selectively positionable latch member, thereby to urge said selectively positionable latch member to said latch position.

7. The seatback latching mechanism of claim 5, wherein said first and second abutment means together form a spur member that is physically interposed between said first stop means and said first contact surface of said selectively positionable latch member when said selectively positionable latch member is in said latching position.

8. The seatback latching mechanism of claim 7, wherein the center of gravity of the selectively positionable latch member, when in said unlatching and latching positions, is located horizontally between said latch pivot axis and said second abutment means so as to cause said first contact surface to be biased downwardly toward contact with said second abutment means.

9. The seatback latching mechanism of claim 8, wherein, when said selectively positional latch member is in said latching position, said first stop means, said spur member, said first contact surface of said selectively positionable latch member and said second contact surface of said selectively positionable latch member and said second stop means are located in seriatim with one another in the order as stated.

10. The seatback latching mechanism of claim 9, wherein said first stop means is located forwardly of said second stop means.

11. The seatback latching mechanism of claim 10, wherein said center of gravity of said selectively positionable latch member is located forwardly of said latch pivot axis so as to cause said selectively positionable latch member to tend to pivot downwardly toward said latching position.

12. The seatback latching mechanism of claim 11, wherein, when said selectively positionable latch member is in said latching position, said second abutment means is the sole means of supporting said selectively positionable latch member to thereby preclude further downwardly directed pivotal movement of said selectively positionable latch member.

13. The seatback latching mechanism of claim 12, wherein the tangent line tangential to said first contact surface, at the portion of said first contact surface that is in intimate contact with said second abutment means, is sloped upwardly and forwardly by an amount of 5° to 6° with respect to a line passing through said latch pivot axis and perpendicular to said tangent line, so as to define a corresponding ramp angle.

14. The seatback latching mechanism of claim 6, wherein said first hinged member is mounted on said seatback member and said second hinged member is mounted on said seat member.

15. The seatback latching mechanism of claim 1, further comprising a third hinged member securely attached to said first hinged member in spaced relation thereto.

16. The seatback latching mechanism of claim 15, wherein said first and second stop means each also act so as to retain said first and third hinged members in spaced relation with respect to each other.

* * * * *